US011881128B2

(12) United States Patent
Wang et al.

(10) Patent No.: US 11,881,128 B2
(45) Date of Patent: Jan. 23, 2024

(54) DISPLAY PANEL, DISPLAY DEVICE, AND METHOD FOR MANUFACTURING DISPLAY PANEL

(71) Applicants: KUNSHAN NEW FLAT PANEL DISPLAY TECHNOLOGY CENTER CO., LTD., Kunshan (CN); KUNSHAN GO-VISIONOX OPTO-ELECTRONICS CO., LTD., Kunshan (CN)

(72) Inventors: Gang Wang, Kunshan (CN); Li Lin, Kunshan (CN); Zhenzhen Han, Kunshan (CN); Siming Hu, Kunshan (CN); Weilong Li, Kunshan (CN); Lu Zhang, Kunshan (CN)

(73) Assignees: KUNSHAN NEW FLAT PANEL DISPLAY TECHNOLOGY CENTER CO., LTD., Kunshan (CN); KUNSHAN GO-VISIONOX OPTO-ELECTRONICS CO., LTD., Kunshan (CN)

( * ) Notice: Subject to any disclaimer, the term of this patent is extended or adjusted under 35 U.S.C. 154(b) by 513 days.

(21) Appl. No.: 17/182,248

(22) Filed: Feb. 23, 2021

(65) Prior Publication Data

US 2021/0183276 A1 Jun. 17, 2021

Related U.S. Application Data

(63) Continuation of application No. PCT/CN2019/107315, filed on Sep. 23, 2019.

(30) Foreign Application Priority Data

Jan. 8, 2019 (CN) ........................ 201910015504.3

(51) Int. Cl.
*G06F 1/16* (2006.01)
*G09F 9/30* (2006.01)

(52) U.S. Cl.
CPC .................................... *G09F 9/301* (2013.01)

(58) Field of Classification Search
CPC ....... G06F 1/1641; G06F 1/1652; G09F 9/301
See application file for complete search history.

(56) References Cited

U.S. PATENT DOCUMENTS

2016/0343964 A1 11/2016 Kwon
2017/0040306 A1* 2/2017 Kim ....................... H05K 1/181
(Continued)

FOREIGN PATENT DOCUMENTS

CN 106486520 A 3/2017
CN 106848106 A 6/2017
(Continued)

OTHER PUBLICATIONS

Office Actions of CN Patent Application No. 201910015504.3.
International Search Report of PCT/CN2019/107315.

*Primary Examiner* — Anthony Q Edwards
(74) *Attorney, Agent, or Firm* — KILPATRICK TOWNSEND & STOCKTON LLP

(57) ABSTRACT

The present disclosure relates to a display panel, a display device and a method for manufacturing the display panel. The display panel includes a display area and a bending area located outside the display area; and includes a substrate and a plurality of metal traces, the substrate includes a first barrier layer provided with a plurality of through-hole grooves, and the plurality of metal traces are located on the first barrier layer, and arranged by avoiding the through-hole grooves on the first barrier layer.

10 Claims, 4 Drawing Sheets

(56) References Cited

U.S. PATENT DOCUMENTS

| | | | | |
|---|---|---|---|---|
| 2017/0062760 | A1 | 3/2017 | Kim | |
| 2018/0108863 | A1 | 4/2018 | Kajiyama | |
| 2018/0309088 | A1 | 10/2018 | Gong et al. | |
| 2019/0163238 | A1 | 5/2019 | Zhang et al. | |
| 2019/0189639 | A1 | 6/2019 | Zuo et al. | |
| 2019/0237490 | A1 | 8/2019 | Hu et al. | |
| 2020/0091197 | A1 | 3/2020 | Li et al. | |
| 2020/0295115 | A1 | 9/2020 | Zhu et al. | |
| 2020/0313111 | A1* | 10/2020 | Kim .................... | H04M 1/0268 |
| 2020/0380894 | A1 | 12/2020 | Mao et al. | |

FOREIGN PATENT DOCUMENTS

| | | | |
|---|---|---|---|
| CN | 107706214 | A | 2/2018 |
| CN | 107731104 | A | 2/2018 |
| CN | 207233319 | U | 4/2018 |
| CN | 107994036 | A | 5/2018 |
| CN | 108172122 | A | 6/2018 |
| CN | 108257971 | A | 7/2018 |
| CN | 108281386 | A | 7/2018 |
| CN | 208208203 | U | 12/2018 |
| CN | 109378325 | A | 2/2019 |
| CN | 109560110 | A | 4/2019 |
| CN | 109637369 | A | 4/2019 |
| CN | 209401247 | U | 9/2019 |
| JP | 2018063388 | A | 4/2018 |

* cited by examiner

DISPLAY PANEL, DISPLAY DEVICE, AND METHOD FOR MANUFACTURING DISPLAY PANEL

CROSS REFERENCE TO RELATED APPLICATIONS

The present application is a continuation application of the PCT application No. PCT/CN2019/107315, filed on Sep. 23, 2019, which claims priority to Chinese Patent Application No. 201910015504.3, filed on Jan. 8, 2019, and the contents of both applications are herein incorporated by reference in their entirety.

TECHNICAL FIELD

The present disclosure relates to the field of display, and particularly to a display panel.

BACKGROUND

With the development of information technology, display devices such as mobile phones have become indispensable tools in people's lives, and the "full screen display" has become the pursuit of more and more users. In order to make the flexible display panel achieve an effect of full screen display, a non-display area is usually bent to implement the effect of full screen display, that is, the non-display area of the flexible display panel is bent to the back of the flexible display panel to reduce the width of the border of the display panel, thereby improving the screen-to-body ratio.

SUMMARY

In view of this, it is necessary to provide a display panel which can effectively reduce a bending stress on metal traces in a bending area.

A display panel is provided, which includes a display area and a bending area located outside the display area;

and includes a substrate and a plurality of metal traces;

the substrate includes a first barrier layer provided with a plurality of through-hole grooves, and the plurality of metal traces are located on the first barrier layer, and are arranged by avoiding the through-hole grooves on the first barrier layer.

In the above display panel, a plurality of through-hole grooves are provided on the first barrier layer. When the bending area of the display panel is bent, the through-hole grooves can release the bending stress on the first barrier layer, thereby reducing the stress of the first barrier layer acting on the metal traces, i.e., reducing the bending stress of the metal traces in the bending area, to effectively ensure the normal display of the display panel.

The present disclosure further provides a method for manufacturing a display panel.

A method for manufacturing a display panel includes:

forming a first barrier layer initial body of the substrate;

forming a metal layer on the first barrier layer initial body; and sequentially or simultaneously patterning the metal layer and the first barrier layer initial body to form the metal traces and the first barrier layer having the through-hole grooves.

In the display panel manufactured by the method for manufacturing the display panel described above, a plurality of through-hole grooves are provided on the first barrier layer of the display panel. When the bending area of the display panel is bent, the through-hole grooves can release the bending stress on the first barrier layer, thereby reducing the stress of the first barrier layer acting on the metal traces, i.e., reducing the bending stress on the metal traces in the bending area, to effectively ensure the normal display of the display panel.

DETAILED DESCRIPTION

The display panel includes a display area and a bending area located outside the display area. The bending area of the display panel includes a substrate and metal traces formed on the substrate. During the bending process, stress concentration is easily produced on metal traces in the bending area of the display panel. When the stress concentration is serious, normal display of the display panel is affected. When the bending area of the display panel is bent, stress concentration is easily produced on the metal trace in the bending area. When the stress concentration is serious, it can affect the normal display of the display panel.

A reason for which the stress concentration is easily produced on the metal trace in the bending area when the bending area of the display panel is bent lies in that: the substrate of the bending area includes a flexible substrate and a barrier layer formed on one side of the flexible substrate adjacent to the metal trace. The barrier layer is generally formed by an inorganic material with a greater hardness. Therefore, when the bending area is bent, a larger bending stress is easily produced in the barrier layer, and then directly or indirectly acts on the metal trace, thereby causing the stress concentration to be produced on the metal trace. When the stress concentration is serious, it may cause the metal trace in the bending area to break, thereby further affecting the normal display of the display panel.

In view of this, the present disclosure provides a display panel in which the bending stress on the metal trace in the bending area can be reduced, a display device including the display panel and a method for manufacturing the display panel.

It should be noted that when it is considered that another element is "formed" on one element, the another element is directly formed or there is also an intermediate element.

Unless otherwise defined, all technical and scientific terms used herein have the same meaning as commonly understood by one of ordinary skill in the art to which the present disclosure applies. The terms used in the specification of the present disclosure are only for the purpose of describing specific embodiments and are not intended to limit the present disclosure.

Figure 1:
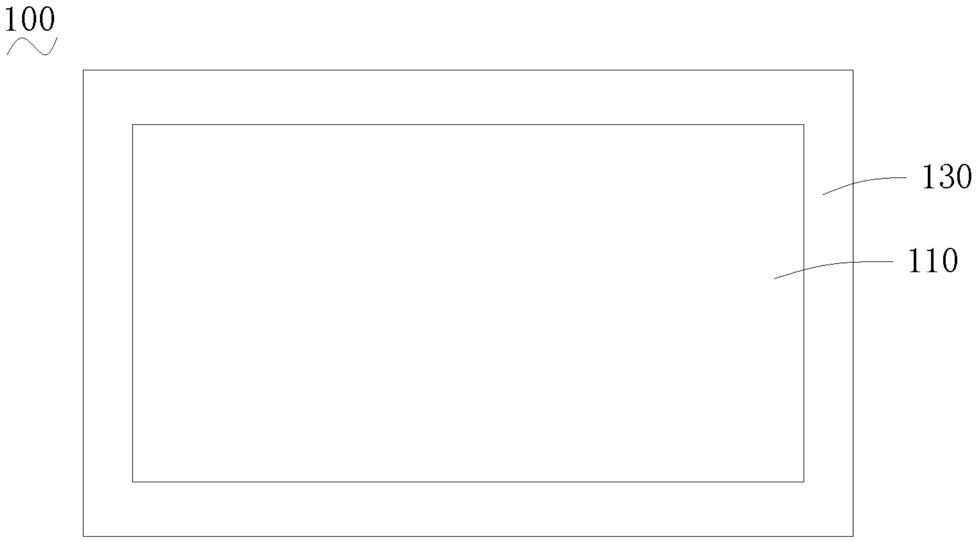
FIG. 1 is a schematic structure diagram of a display panel provided by an embodiment of the present disclosure.
Figure 2:
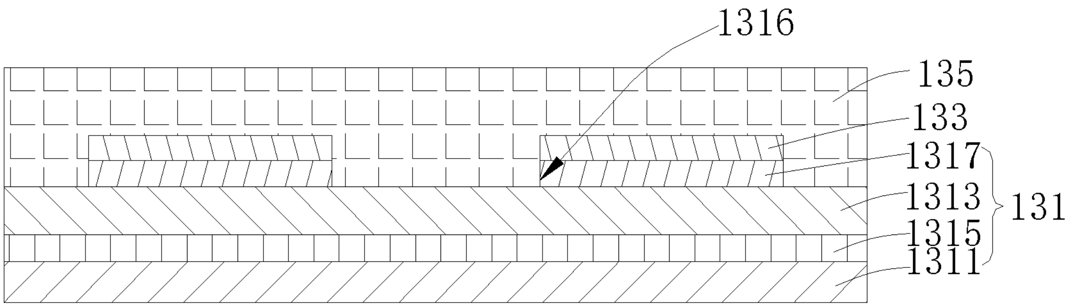
FIG. 2 is a schematic cross-sectional view of a bending area of the display panel in FIG. 1.
Figure 3:
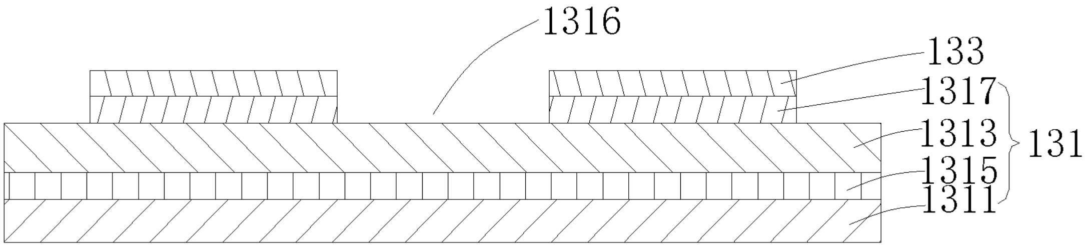
FIG. 3 is a schematic cross-sectional view of the bending area of the display panel in FIG. 2 when no planarization layer is formed.

As shown in FIG. 1 to FIG. 3, a display panel 100 provided by an embodiment of the present disclosure includes a display area 110 and a bending area 130 located outside the display area 110.

The bending area 130 includes a substrate 131 and a plurality of metal traces 133.

The substrate 131 includes a first barrier layer 1317. The first barrier layer 1317 is provided with a plurality of through-hole grooves 1316. The metal traces 133 are located on the first barrier layer 1317. The metal traces 133 are arranged by avoiding the through-hole grooves 1316 on the first barrier layer 1317. That is, projections of the metal traces 133 on the first barrier layer 1317 deviate from the through-hole grooves 1316, for example, the projections of the metal traces 133 do not overlap the through-hole grooves 1316.

The substrate 131 may further include a first flexible substrate 1313, a second flexible substrate 1311, and a second barrier layer 1315. The first barrier layer 1317, the first flexible substrate 1313, the second barrier layer 1315, and the second flexible substrate 1311 are sequentially stacked. The first barrier layer 1317 is configured to prevent the metal traces 133 from being eroded by water and oxygen. The metal traces 133 are located on one side of the first barrier layer 1317 away from the first flexible substrate 1313.

When the bending area 130 of the display panel 100 is bent, the through-hole grooves 1316 can release a bending stress on the first barrier layer 1317, thereby reducing a stress acting by the first barrier layer 1317 on the metal traces 133, which can effectively prevent the breakage of the metal traces 133 in the bending area 130, so as to effectively ensure the normal display of the display panel 100. The metal traces 133 can be directly provided on a surface of the first barrier layer 1317, or another material layer can be provided between the metal traces 133 and the first barrier layer 1317.

In the embodiment, the substrate 131 can include two barrier layers, a second barrier layer 1315 and a first barrier layer 1317. Since no through-hole groove 1316 is provided on the second barrier layer 1315, which can act to block water and oxygen. Therefore, the through-hole grooves 1316 can be provided on the first barrier layer 1317.

In the embodiment, the bending area 130 surrounds all side edges of the display area 110. Of course, according to requirements, in other embodiments, the bending area 130 can also be only outside part of the side edges of the display area 110.

The bending area 130 of the display panel 100 can further include at least one of an active layer, a planarization layer 135, an anode layer, a pixel definition layer, a support pillar layer.

In the embodiment, at least one through-hole groove 1316 is correspondingly provided between every two adjacent metal traces 133. Accordingly, the through-hole groove 1316 release a bending stress of the first barrier layer 1317 under a metal trace 133 from both sides of the metal trace 133, so as to avoid that the bending stress is transmitted to the metal trace 133 over the first barrier layer 1317 due to an excessive local bending stress of the first barrier layer 1317, i.e., a situation where the metal trace 133 is broken caused by the stress concentration on partial metal trace 133 is avoided, thereby effectively ensuring the display effect of the display panel 100.

In the embodiment, the through-hole groove 1316 can extend along an extension direction of an adjacent metal trace 133. Accordingly, the bending stress of the first barrier layer 1317 under the metal trace 133 can be released more evenly, thereby avoiding the excessive local stress on the first barrier layer under the metal trace 133.

In the embodiment, an area of the first barrier layer 1317 where no through-hole groove 1316 is provided is located under the metal trace 133. In other words, portions of the first barrier layer 1317 which are not covered by the metal traces 133 are all dug to form through-hole grooves 1316, so that the first barrier layer 1317 is in a discontinuous state, thereby increasing the bending resistance of the first barrier layer 1317 to a greater extent.

Specifically, in the embodiment, the second barrier layer 1315 and the first barrier layer 1317 may both be a silicon nitride layer or a silicon oxide layer. Apparently, the second barrier layer 1315 and the first barrier layer 1317 may also be other inorganic film layers commonly used in the art.

Figure 4:
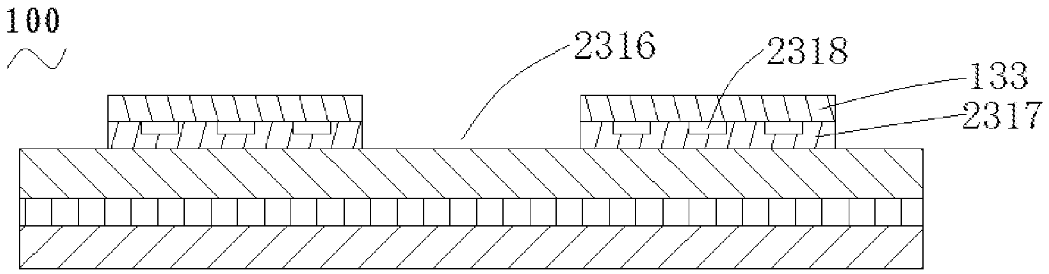
FIG. 4 is a schematic cross-sectional view of a bending area of a display panel provided by another embodiment of the present disclosure.

As shown in FIG. 4, a display panel 100 is provided by another embodiment of the present disclosure, which differs from the display panel 100 in that, a groove 2318 is provided in an area of the first barrier layer 2317 where no through-hole groove 2316 is provided. A depth of the groove 2318 is less than a thickness of the first barrier layer 2317. Accordingly, the bending resistance of the first barrier layer 2317 in the area is increased to better reduce the bending stress acting on the metal trace 133.

Specifically, in the embodiment, the groove 2318 can be provided on one side of the first barrier layer 2317 adjacent to the metal trace 133. Apparently, in other embodiments, the groove can also be provided on one side of the first barrier layer away from the metal trace 133, or the grooves can be provided on one side of the first barrier layer away from the metal trace 133 and on one side of the first barrier layer adjacent to the metal trace 133, as long as it is guaranteed that the grooves do not make the flexible substrate under the first barrier layer exposed.

Further, in another embodiment, a buffer material can further be provided in the groove 2318 to relieve the bending stress of the first barrier layer 2317, thereby further reducing the bending stress acting on the metal trace 133. It should be appreciated that, when the groove 2318 is provided on one side of the first barrier layer 2317 adjacent to the metal trace 133, the buffer material provided in the groove 2318 cannot contain water vapor or generate water vapor under a condition such as a high temperature, to prevent the metal trace 133 from being oxidized.

Figure 5:
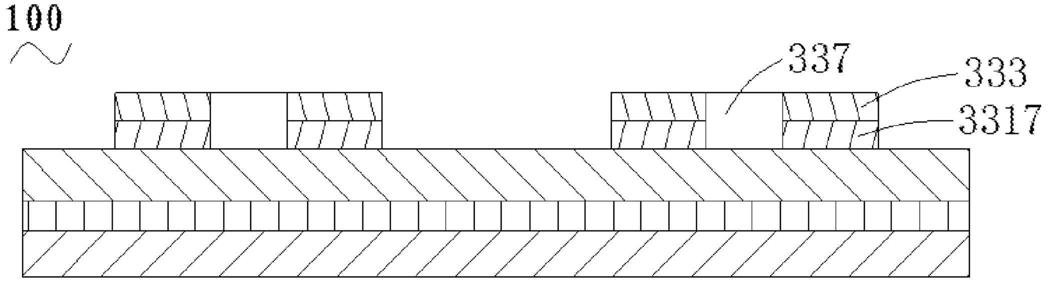
FIG. 5 is a schematic cross-sectional view of a bending area of a display panel provided by another embodiment of the present disclosure.
Figure 6:
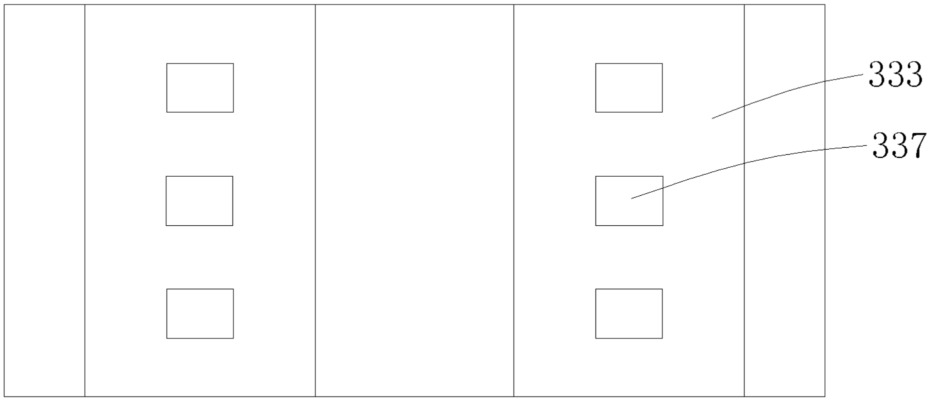
FIG. 6 is a top view of the bending area of the display panel in FIG. 5.

As shown in FIGS. 5 and 6, a display panel 100 is provided by another embodiment of the present disclosure, which differs from the display panel 100 in that, a plurality of through holes 337 passing through the metal trace 333 and the first barrier layer 3317 are provided in the bending area. The through hole 337 can simultaneously increase the bending resistances of the first barrier layer 3317 and the metal trace 333. That is, when the display panel 300 is bent, the through hole 337 can release and reduce the bending stress of the first barrier layer 3317 and the metal trace 333. The bending stress of the first barrier layer 3317 is reduced, and the stress of the first barrier layer 3317 acting on the metal trace 333 is correspondingly reduced, thereby better reducing the bending stress acting on the metal trace 333.

In another embodiment, the substrate can further include more than two barrier layers and more than two flexible substrates.

Figure 7:
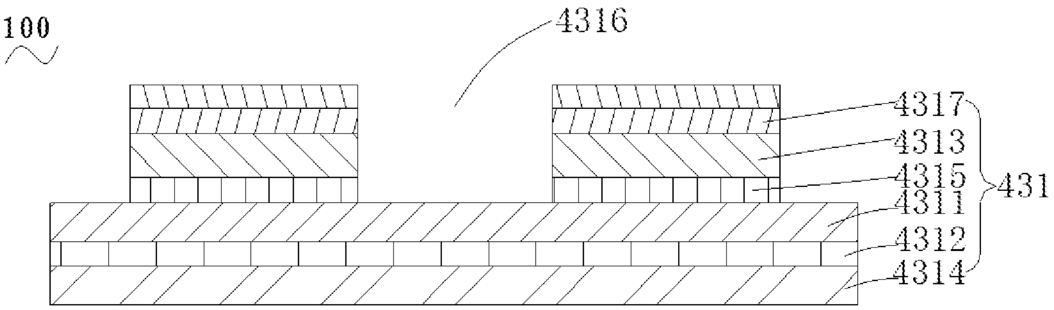
FIG. 7 is a schematic cross-sectional view of a display panel provided by another embodiment of the present disclosure when no planarization layer is formed.

Specifically, as shown in FIG. 7, a display panel 100 is provided by another embodiment of the present disclosure, which differs from the display panel 100 in that, the substrate 431 further includes a third barrier layer 4312 located on one side of the second barrier layer 4315 away from the first barrier layer 4317. The through-hole groove 4316 passes through the second barrier layer 4315. By this time, the third barrier layer 4312 is configured to prevent the metal trace and the like from being eroded.

Apparently, the substrate 431 may further include a third flexible substrate 4314. The first barrier layer 4317, the first flexible substrate 4313, the second barrier layer 4315, the second flexible substrate 4311, the third barrier layer 4312, and the third flexible substrate 4314 are sequentially stacked.

An embodiment of the present disclosure further provides a display device including the display panel 100.

The above-mentioned display device includes the display panel 100, a plurality of through-hole grooves 1316 are provided on the first barrier layer 1317 of the display panel 100. When the bending area 130 of the display panel 100 is bent, the through-hole grooves 1316 can release the bending stress on the first barrier layer 1317, thereby reducing the stress of the first barrier layer 1317 acting on the metal trace 133, which can effectively prevent the breakage of the metal trace 133 in the bending area 130, to ensure the normal display of the display panel 100 and increase the service life of the display device.

Figure 8:
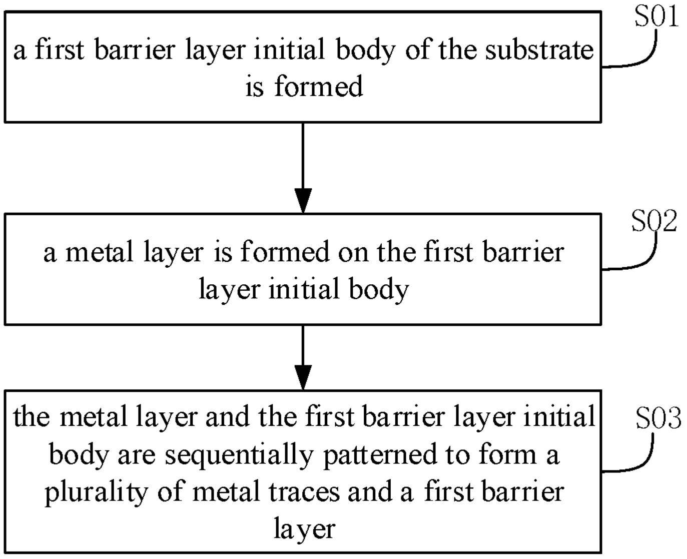
FIG. 8 is a flow chart showing a method for manufacturing a display panel according to an embodiment of the present disclosure.

As shown in FIG. 8, an embodiment of the present disclosure further provides a method for manufacturing the display panel 100, which includes the following steps.

At step S01, a first barrier layer initial body of the substrate 131 is formed.

It can be understood that the first barrier layer initial body is a first barrier layer 1317 without a through-hole groove 1316.

In addition, before the first barrier layer initial body is formed, a second flexible substrate 1311, a second barrier layer 1315, and a first flexible substrate 1313 are sequentially formed in a stacking form.

At step S02, a metal layer is formed on the first barrier layer initial body.

At S03, the metal layer and the first barrier layer initial body are sequentially patterned to form a plurality of metal traces 133 and a first barrier layer 1317.

In other words, both the metal traces 133 and the first barrier layer 1317 are finally formed by patterning. In addition, the process of patterning the first barrier layer initial body is the process of forming the through-hole groove 1316 on the first barrier layer 1317.

Figure 9:
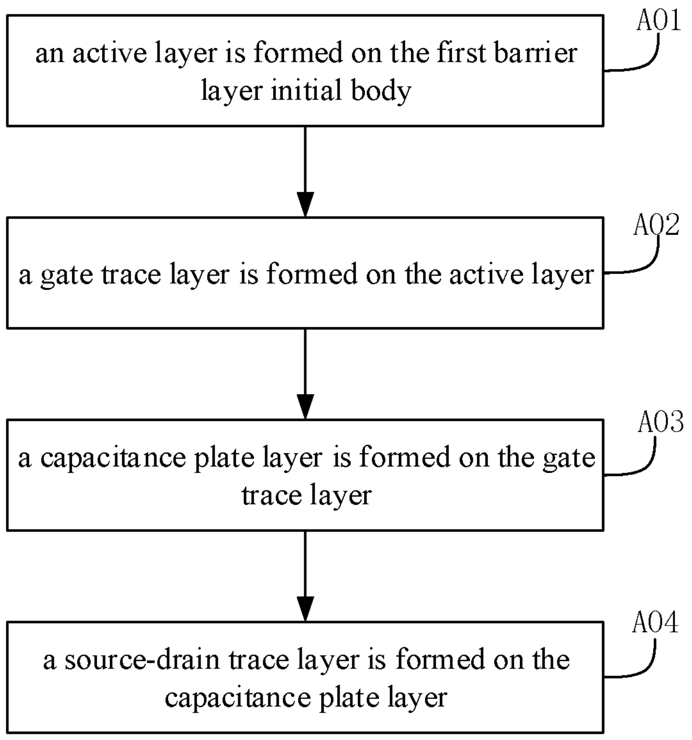
FIG. 9 is a flow chart showing a method for manufacturing a display panel according to another embodiment of the present disclosure.

It should be understood that, as shown in FIG. 9. the method for manufacturing the display panel 100, after the step S01, further includes the following steps.

At step A01, an active layer is formed on the first barrier layer initial body.

At step A02, a gate trace layer is formed on the active layer.

At step A03, a capacitance plate layer is formed on the gate trace layer.

At step A04, a source-drain trace layer is formed on the capacitance plate layer.

Apparently, the method further includes a step of forming an inorganic film layer and forming a via hole between two of the active layer, the gate trace layer, the capacitance plate layer, and the source-drain trace layer. The step S02 may include at least one of the step A02, the step A03, and the step A04.

In addition, after the step S03, the method further includes a step of forming a planarization layer, an anode layer, a pixel definition layer, a support pillar layer, and the like. It should be understood that, the step of forming the planarization layer, the anode layer, the pixel definition layer, and the support pillar layer is performed after the step A04.

In the display panel 100 manufactured by the method for manufacturing the display panel described above, a plurality of through-hole grooves 1316 are provided on the first barrier layer 1317 of the display panel 100. When the bending area 130 of the display panel 100 is bent, the through-hole grooves 1316 can release the bending stress on the first barrier layer 1317, thereby reducing the stress of the first barrier layer 1317 on the metal traces 133, which can effectively prevent the breakage of the metal traces 133 in the bending area 130, to ensure the normal display of the display panel 100.

In addition, the inventors discovered through research that if the first barrier layer having through-hole grooves is directly formed, the flexible substrate is exposed. When the metal layer is formed, the exposed flexible substrate may cause chamber contamination.

In the above method for manufacturing the display panel 100, the first barrier layer initial body is not patterned before the metal layer is formed, so that the phenomenon that the second flexible substrate 1311 is exposed when the metal layer is formed is avoided, thereby effectively preventing the chamber contamination caused by the exposed first flexible substrate 1313 when the metal layer is formed.

In the embodiment, the metal layer and the first barrier layer initial body are sequentially patterned, which means that the metal layer and the first barrier layer initial body are sequentially patterned through two processes. Specifically, the mode of patterning the metal layer is as follows: a photomask is employed to expose the metal layer; the metal layer is etched by an etching method to form the metal traces 133. The mode of patterning the first barrier layer initial body is as follows: a photomask is employed to expose the first barrier layer initial body; the first barrier layer initial body is etched by an etching method to form the first barrier layer 1317.

Figure 10:
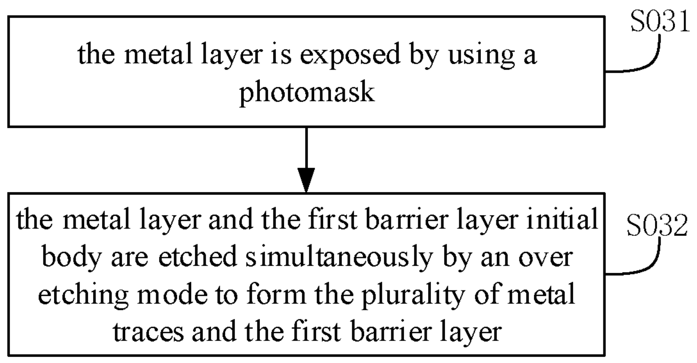
FIG. 10 is a flow chart showing a method for manufacturing a display panel according to another embodiment of the present disclosure.

In another embodiment, the metal layer and the first barrier layer initial body can be simultaneously patterned. Specifically, as shown in FIG. 10, the steps of simultaneously patterning the metal layer and the first barrier layer initial body to form the plurality of metal traces 133 and the first barrier layer 1317 includes following steps.

At step S031, the metal layer is exposed by using a photomask.

At step S032, the metal layer and the first barrier layer initial body are etched simultaneously by an over etching mode to form the plurality of metal traces 133 and the first barrier layer 1317.

It should be understood that, the simultaneous patterning of the metal layer and the first barrier layer initial body can effectively improve production efficiency.

The technical features of the above-described embodiments can be combined arbitrarily. To simplify the description, all possible combinations of the technical features in the above embodiments are not described. However, all of the combinations of these technical features should be considered as within the scope of the present disclosure, as long as these combinations do not contradict with each other.

The above-described embodiments merely represent several exemplary embodiments of the present disclosure, and the description thereof is more specific and detailed, but these embodiments should not be construed as limiting the scope of the present disclosure. It should be noted that, several modifications and improvements can be made by those of ordinary skill in the art without departing from the concept of the present disclosure, and these modifications and improvements are all within the protection scope of the present disclosure. Therefore, the protection scope of the present disclosure shall be subject to the appended claims.

What is claimed is:

1. A display panel, comprising:

a display area; and a bending area, located outside the display area;

wherein the display area comprises a substrate and a plurality of metal traces located on a first barrier layer, the substrate comprising the first barrier layer provided with a plurality of through-hole grooves; and the metal traces being arranged by avoiding the through-hole grooves on the first barrier layer.

2. The display panel according to claim 1, wherein at least one through-hole groove is correspondingly provided between every two adjacent metal traces.

3. The display panel according to claim 1, wherein a through-hole groove extends along an extension direction of adjacent ones of the plurality of metal traces.

4. The display panel according to claim 1, wherein a portion of the first barrier layer in which no through-hole groove is provided is located under the plurality of metal traces.

5. The display panel according to claim 1, wherein one or more grooves are provided in a portion of the first barrier layer in which no through-hole groove is provided, and a depth of the one or more grooves is less than a thickness of the first barrier layer.

6. The display panel according to claim 5, wherein a buffer material is provided in the one or more grooves.

7. The display panel according to claim 1, wherein the bending area is provided with one or more through holes passing through the plurality of metal traces and the first barrier layer.

8. The display panel according to claim 1, wherein the substrate further comprises a second barrier layer formed on one side of the first barrier layer away from the plurality of metal traces.

9. The display panel according to claim 8, wherein the substrate further comprises a third barrier layer formed on one side of the second barrier layer away from the first barrier layer, and the through-hole grooves pass through the second barrier layer.

10. A display device, comprising the display panel according to claim 1.

* * * * *